United States Patent [19]

Snitzer

[11] Patent Number: 5,388,110
[45] Date of Patent: Feb. 7, 1995

[54] SUPERLUMINESCENT LIGHT SOURCE FOR AN INTERFEROMETRIC FIBER OPTIC GYROSCOPE

[76] Inventor: Elias Snitzer, 8 Smoke Tree Close, Piscataway, N.J. 08854

[21] Appl. No.: 56,025

[22] Filed: Apr. 30, 1993

[51] Int. Cl.$^6$ .............................................. H01S 3/30
[52] U.S. Cl. ......................................... 72/6; 372/41; 372/68; 372/69
[58] Field of Search ................... 372/6, 41, 92, 69, 70, 372/75, 68

[56] References Cited

U.S. PATENT DOCUMENTS

| | | | |
|---|---|---|---|
| 4,044,315 | 8/1977 | Snitzer | 372/6 |
| 4,969,150 | 11/1990 | Esterowitz et al. | 372/41 |
| 5,268,910 | 12/1993 | Huber | 372/6 |
| 5,299,210 | 3/1994 | Snitzer et al. | 372/6 |
| 5,311,603 | 5/1994 | Fidric | 372/6 |

OTHER PUBLICATIONS

"Progress in Interferometer and Resonator Fiber Optic Gyros", by G. A. Sanders, R.-Y. Liu and L. K. Strandjord, Conf. Proc. 8th Optical Fiber Sensor Conf. Jan. 29-31, 1992 pp. 26-29.

"Integrated 1.06 $\mu$m Fiber Gyro Superluminescent Source" by W. K. Burns, R. P. Moeller, E. Snitzer, and G. Puc, Conf. Proc. 8th Optical Fiber Sensor Conf. Jan. 29-31, 1992, pp. 42-46.

Primary Examiner—Léon Scott, Jr.
Attorney, Agent, or Firm—Michael B. Einschlag

[57] ABSTRACT

A light source for an interferometric fiber optic gyroscope ("IFOG") includes a thulium (Tm+++) doped optical fiber which exhibits superluminescence in a wavelength region substantially centered at about 1.8 microns.

28 Claims, 6 Drawing Sheets

FIG. 1

RARE EARTH ENERGY LEVELS

FIG. 2
THULIUM IN SILICA (Ge, Al)

FIG. 3

FIG. 4
ERBIUM, THULIUM EMISSION

SUPERLUMINESCENT LIGHT SOURCE FOR AN INTERFEROMETRIC FIBER OPTIC GYROSCOPE

TECHNICAL FIELD OF THE INVENTION

The present invention pertains to an interferometric fiber optic gyroscope ("IFOG") and, in particular, to a light source for an IFOG comprised of a thulium (Tm) doped, optical fiber which exhibits superluminescence in a wavelength region substantially centered at about 1.8 microns.

BACKGROUND OF THE INVENTION

Interferometric fiber optic gyroscopes ("IFOG") are well known in the art. Briefly, as is well known in the art, an IFOG is apparatus which utilizes a difference in phase of light that travels through a fiber optic coil, both clockwise and counterclockwise, relative to an axis of rotation of the fiber optic coil. In the art, such apparatus have been fabricated utilizing a superluminescent neodymium (Nd) doped glass fiber emitting substantially at a wavelength of 1.06 microns or a superluminescent erbium (Er) doped glass fiber emitting in a wavelength region substantially between 1.53 to 1.55 microns.

An article entitled "Progress in Interferometer and Resonator Fiber Optic Gyros" by G. A. Sanders, R. -Y. Liu and L. K. Strandjord, published in the *Conference Proceedings of the 8th Optical Fiber Sensors Conference*, Jan. 29–31, 1992, pp. 26–29 (article 1) and an article entitled "Integrated 1.06 um Fiber Gyro Superluminescent Source" by W. K. Burns, R. P. Moeller, E. Snitzer, and G. Puc, published in the *Conference Proceedings of the 8th Optical Fiber Sensors Conference*, Jan. 29–31, 1992, pp. 42–46 (article 2) disclose such prior art IFOG apparatus.

As is well known in the art, there are a number of ways in which an IFOG can be fabricated. As shown in FIG. 2 of article 1, the most common IFOG apparatus comprises a light source which is coupled into a lithium niobate (LiNbO$_3$) integrated optic chip and a single mode, single polarization or polarization maintaining fiber coil. As further discussed in article 1, LiNbO$_3$ integrated optics chips are commercially available for providing bias modulation and serrodyne modulation used in fabricating the IFOG apparatus. Further, the block diagram of FIG. 2 of article 1 provides an example of an IFOG apparatus which is fabricated from readily available circuits and devices which are well known to those of ordinary skill in the art.

As discussed in article 2, there is great interest in using fiber optic superluminescent sources in a fiber optic gyroscope as a replacement for semiconductor superluminescent diodes because of several potential benefits provided by such fiber sources. Such benefits are, for example, higher available power, better wavelength stability with temperature, and improved lifetime. As reported in article 2, such benefits would be expected when an IFOG apparatus is fabricated from an all-fiber source that is coupled into the gyro without bulk optic components. In fact, article 2 reports an all-fiber source wherein: (a) a samarium (Sm) doped fiber is butt coupled to a 0.5 W diode pump array at one end and is spliced to a Nd doped active fiber at the other end (the Sm doped fiber is substantially transparent at the 0.81 um pump wavelength and is heavily absorbing at 1.06 um, thereby providing isolation from the diode array facet) and (b) the Nd doped fiber is further spliced to an input lead of a 1.06 um isolator. As described in article 2, this arrangement advantageously avoids lasing due to feedback, i.e., the arrangement avoids backreflection of backward travelling superluminescent emission off a high reflectivity diode array facet. Further, such an all-fiber source can be spliced into the IFOG without using bulk optic components.

An important criterion used in fabricating an IFOG apparatus is that the light source emit over a broad wavelength interval with substantially no resonant structures within the interval, i.e., the source should appear similar to a natural light source. However, it is also useful to obtain as much light as possible in a single mode fiber in order to increase the sensitivity of the IFOG apparatus. To provide the required broad band, natural light source combined with high intensity, it has become accepted in the art to utilize a superluminescent light source.

In a superluminescent optical fiber light source, spontaneous emission is amplified by induced emission in propagating through a fiber that has been pumped to an inverted state and feedback that would generate laser oscillation is prevented from occurring. As a result, high intensity, amplified spontaneous emission is created.

Although Er doped glass fibers produce a superluminescent spectrum, the spectrum has an asymmetric shape and a small bandwidth.

In light of the above, there is a need in the art for a superluminescent light source which produces a superluminescent spectrum having a substantially symmetric shape, substantially no structure, and a relatively broad bandwidth. In particular, there is a need in the art for such a light source which can be fabricated as an optical fiber light source.

SUMMARY OF THE INVENTION

Embodiments of the present invention advantageously satisfy the above-identified need in the art and provide a superluminescent light source which produces a superluminescent spectrum having a substantially symmetric shape, substantially no structure, and a relatively broad bandwidth. Further, embodiments of the present invention provide such a light source which can be fabricated as an optical fiber light source. Specifically, an embodiment of the present invention is a thulium (Tm) doped, optical fiber, superluminescent light source which provides superluminescent output in a wavelength region substantially centered at about 1.8 microns.

In accordance with the present invention, Tm+++ doped glass provides superluminescent output from the 3F4–3H6 transition in a wavelength region substantially centered at 1.8 microns. Then, in fabricating an IFOG apparatus, a lithium niobate integrated optic chip, a fiber coil, and detectors are selected for optimum performance substantially at 1.8 microns. It should be noted, however, that due to the wavelength of the output from a Tm doped optical fiber, it is feasible to fabricate an IFOG apparatus comprised of a Tm doped optical fiber using an integrated optic chip and fiber coil that have been designed for use with an erbium (Er) doped optical fiber emitting substantially at 1.55 microns. Detectors for use with the inventive Tm doped glass fiber may be fabricated from InGaAs diodes, which diodes have been fabricated by Sensors Unlimited, Inc., Princeton, N.J. and which have sensitivities out to 2.6 microns.

The use of Tm doped glass fiber is advantageous for several reasons. First, a Tm doped glass fiber has a strong absorption in the wavelength region of 800 nanometers. This is a wavelength that is readily pumped with a GaAlAs laser diode. Then, following the absorption of 0.8 micron radiation, by having a high concentration of $Tm^{+++}$ ions (of the order of five thousand parts per million by weight or greater), there results a "two-for-one" transition in which one 0.8 micron pump photon produces two excited Tm ions. Second, $Tm^{+++}$ fluorescence is relatively broad and is relatively symmetric. Third, a $Tm^{+++}$ doped optical fiber can be fabricated in a double clad configuration for more optimal coupling to a source of pumping radiation. The $Tm^{+++}$ can also be pumped by absorption of light substantially at 1.2 microns to excite the ion to the 3H5 level. Pumping can also be achieved by absorption of 1.55 micron radiation from an $Er^{+++}$ laser.

BRIEF DESCRIPTION OF THE DRAWINGS

A complete understanding of the present invention may be gained by considering the following detailed description together with the accompanying drawings, in which.

DETAILED DESCRIPTION

An embodiment of the present invention comprises a thulium (Tm) doped, optical fiber, superluminescent light source emitting in a wavelength region substantially centered at about 1.8 microns from the 3F4–3H6 transition.

Figure 1:
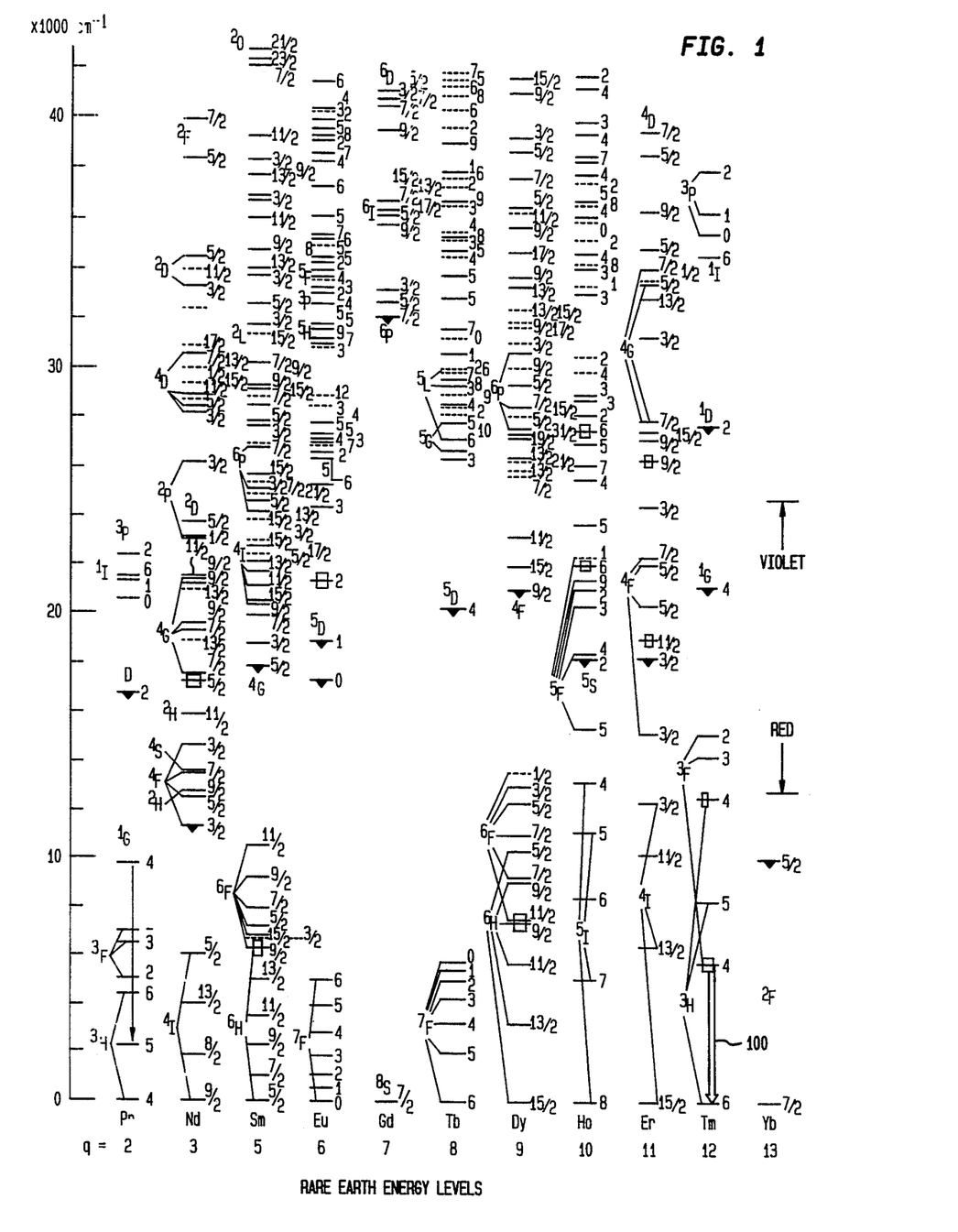
FIG. 1 shows, in pictorial form, an energy level diagram for trivalent rare earth ions.

FIG. 1 shows, in pictorial form, an energy level diagram for trivalent rare earth ions. The laser transition for $Tm^{+++}$ utilized in fabricating embodiments of the present invention is indicated by arrow 100, i.e., the transition between the 3F4 and 3H6 states of $Tm^{+++}$.

Figure 2:
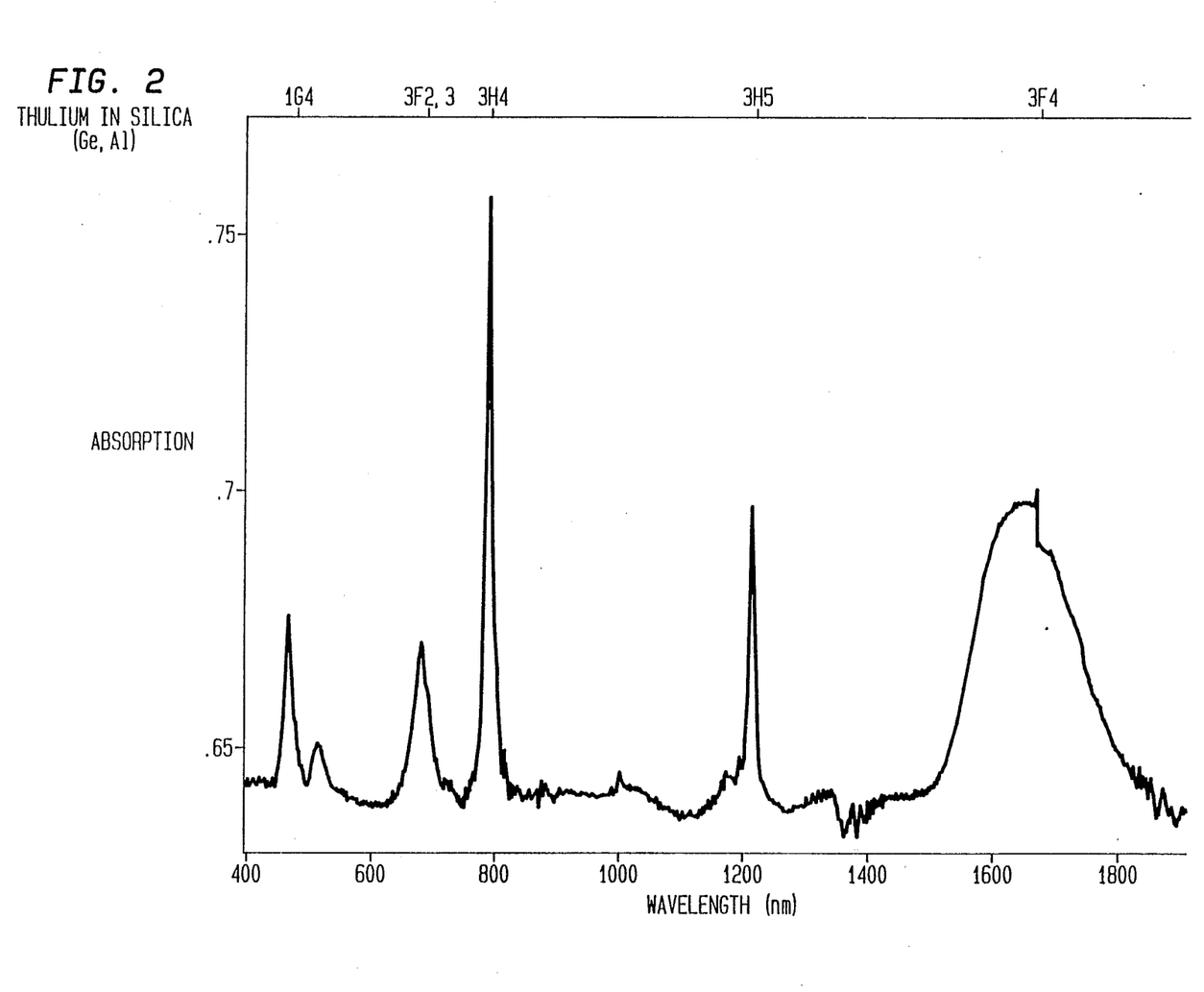
FIG. 2 shows, in graphical form, an absorption spectrum for a thulium ($Tm^{+++}$), germanium and aluminum doped silica fiber.
Figure 3:
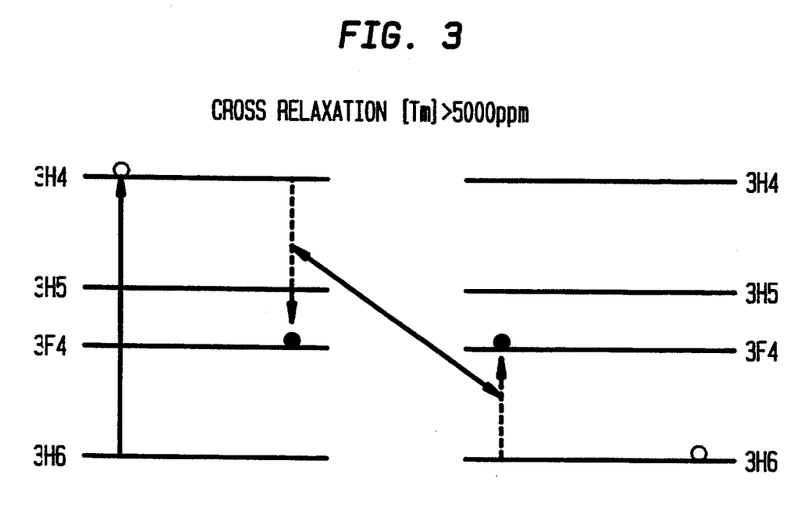
FIG. 3 shows, in pictorial form, a cross relaxation mechanism in a host doped with $Tm^{+++}$ at a concentration greater than 5000 ppm by weight which produces two excited $Tm^{+++}$ ions for each 0.8 micron pump photon.

FIG. 2 shows, in graphical form, an absorption spectrum for a $Tm^{+++}$, germanium, and aluminum doped silica fiber. As shown in FIG. 2, there is a very strong absorption in the wavelength region of 0.8 microns in the 3H4 state, which wavelength is readily generated utilizing a GaAlAs laser diode. Following the absorption of 0.8 micron radiation by highly concentrated $Tm^{+++}$ ions (of the order of five thousand parts per million by weight or greater), there results a "two-for-one" transition in which one 0.8 micron pump photon produces two excited $Tm^{+++}$ ions. This is illustrated in FIG. 3 which shows, in graphical form, a cross relaxation mechanism in a host doped with $Tm^{+++}$ at a concentration greater than 5000 ppm by weight. As shown in FIG. 3, two excited $Tm^{+++}$ ions are produced for each 0.8 micron pump photon—one $Tm^{+++}$ ion which is excited to the 3H4 level by the pump photon decays to the 3F4 state and another $Tm^{+++}$ ion is excited to the 3F4 state. The $Tm^{+++}$ can also be pumped by absorption of light substantially at 1.2 microns to excite the ion to the 3H5 level. Pumping can also be achieved by absorption of 1.55 micron radiation from an $Er^{+++}$ laser.

As is well known, quantum efficiency for a state is determined by the magnitude of non-radiative transition probabilities. Further, as is known, for a particular state, the non-radiative transition probability is a function of the highest energy phonon of the phonon spectrum of a host glass for the rare earth ions. Still further, as is known, the lower the energy of the highest energy phonon, the lower the magnitude of the non-radiative transition probability. Table 1 provides the energy of the highest energy phonon for various glass hosts.

TABLE 1

| Glass | Highest Energy Phonon |
|---|---|
| borate | $\sim 1350$ cm$^{-1}$ |
| phosphate | $\sim 1300$ cm$^{-1}$ |
| silicate | $\sim 1000$ cm$^{-1}$ |
| germanate | $\sim 950$ cm$^{-1}$ |
| tellurite | $\sim 900$ cm$^{-1}$ |
| ZBLAN+ | $\sim 500$ cm$^{-1}$ |
| chalcogenide | $\sim 250$ cm$^{-1}$ |

The data from Table 1 indicate that $Tm^{+++}$ has a reasonable quantum efficiency and that such should be the case for silicate glasses.

Figure 4:
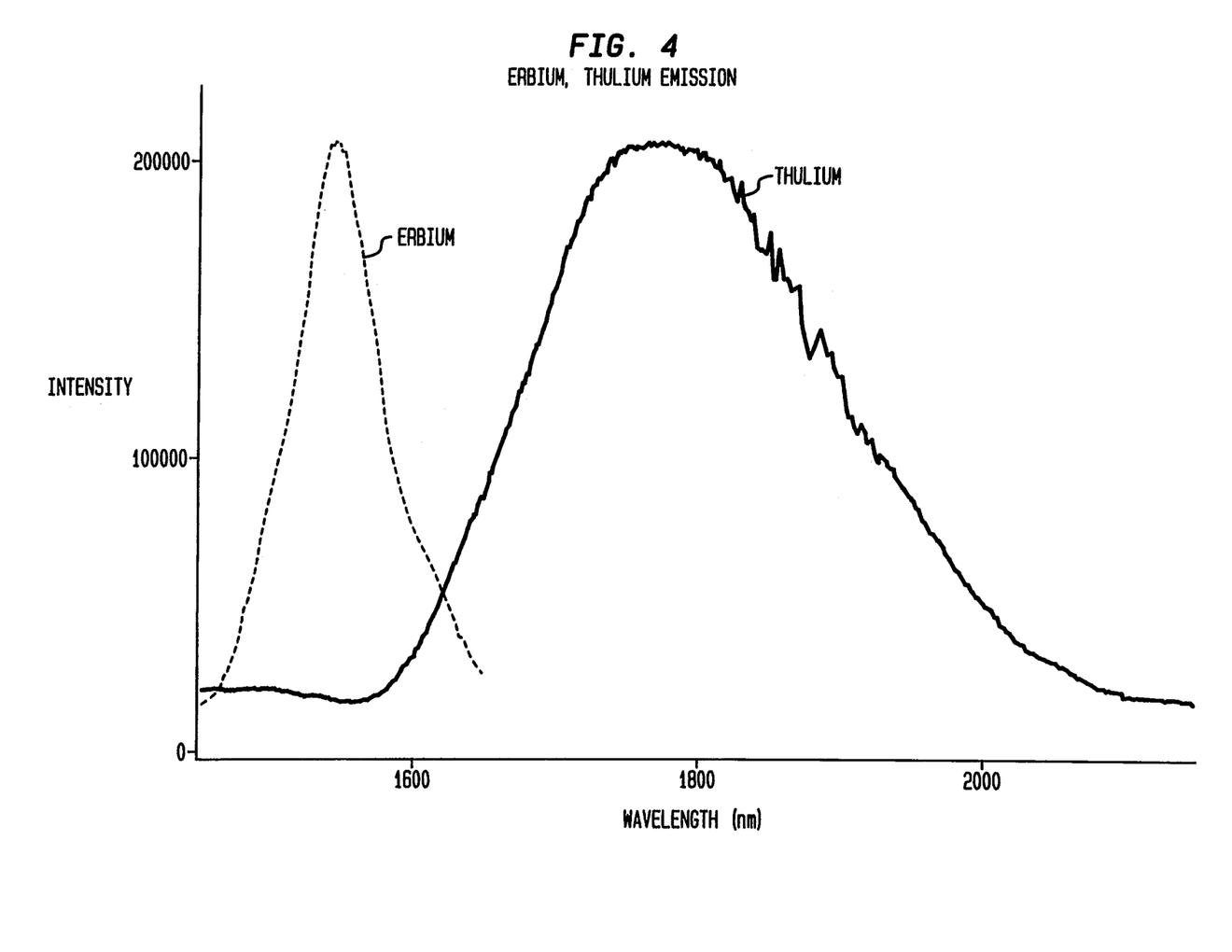
FIG. 4 shows, in graphical form, the fluorescent spectrum of the 3F4–3H6 transition as well as the fluorescent spectrum of erbium (Er) in the wavelength region of 1.55 microns.

FIG. 4 shows, in graphical form, the fluorescent spectrum of the 3F4–3H6 transition as well as the fluorescent spectrum of erbium (Er) in the wavelength region of 1.55 microns. As one can readily appreciate from FIG. 4, two attractive features are associated with the $Tm^{+++}$ emission. The first attractive feature is that the fluorescence is very broad, being of the order of 150 nm. For this reason, it is expected that this $Tm^{+++}$ emission will produce superior performance of an IFOG apparatus fabricated utilizing a Tm doped optical fiber as compared with that fabricated utilizing the much narrower emission of an Er doped optical fiber. The second attractive feature is that the fluorescence from $Tm^{+++}$ is much more symmetric than that from $Er^{+++}$. This is important because, for sufficient pumping, the use of a Tm doped optical fiber will make a measured rotation rate of an IFOG apparatus be relatively independent of signal strength.

Figure 5:
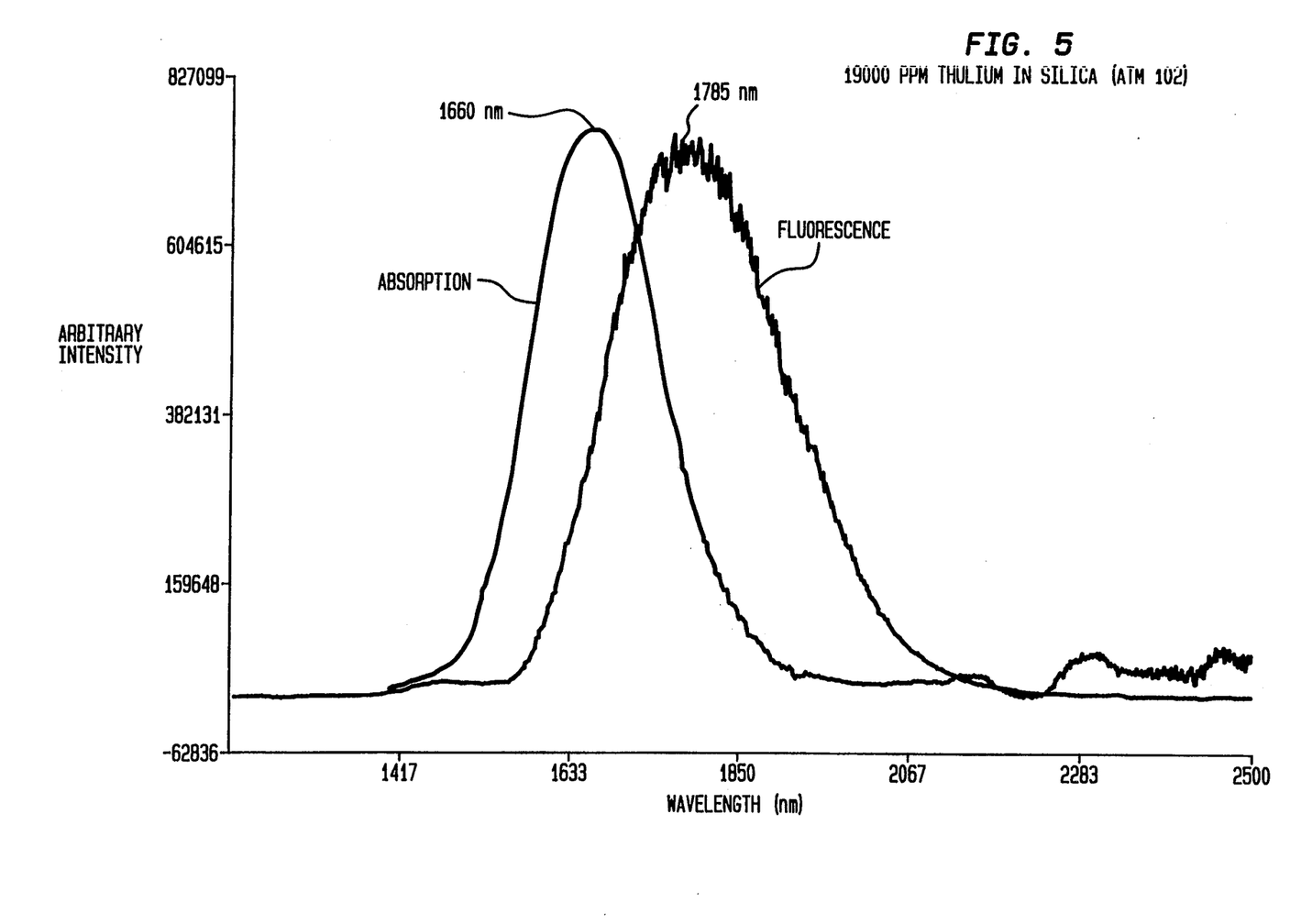
FIG. 5 shows, in graphical form, absorption and fluorescence spectra in the 3F4–3H6 transition which was obtained from a $SiO_2$ fiber which was codoped with $GeO_2$, $Al_2O_3$, and $Tm_2O_3$.

FIG. 5 shows, in graphical form, absorption and fluorescent spectra in the 3F4–3H6 transition obtained from an $SiO_2$ fiber which was codoped with $GeO_2$, $Al_2O_3$, and $Tm_2O_3$. In further embodiments of the present invention, pumping can also be accomplished by codoping the host glass with Er or ytterbium (Yb) or both and by utilizing energy transfer mechanisms from these ions to populate the 3F4 state in Tm. The shift of the emission spectrum from the absorption spectrum in FIG. 5 indicates that emission in Tm+++ is occurring from the 3F4 state.

Figure 6:
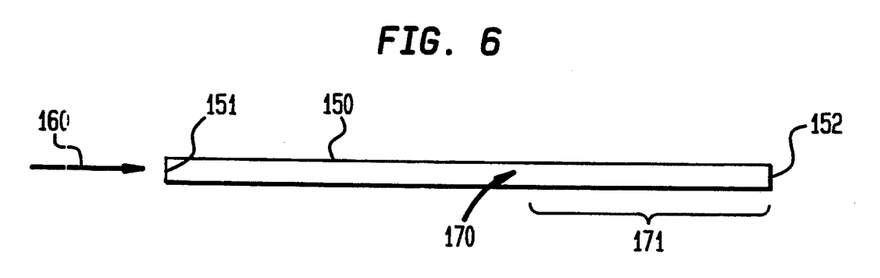
FIG. 6 shows, in pictorial form, an embodiment of a Tm doped optical fiber wherein the length of the Tm doped fiber is substantially longer that the length required to absorb pump light.

FIG. 6 shows, in pictorial form, an embodiment of a Tm doped optical fiber wherein the length of the Tm doped fiber is substantially longer than the length required to absorb pump light. As shown in FIG. 6, Tm+++ doped optical fiber 150 is fabricated to be long enough so that pump radiation 160 which is coupled into fiber 150 at end 151, for example, by a lens (not shown), is substantially totally absorbed by Tm+++ ions at the point in fiber 150 indicated by arrow 170. Superluminescent radiation generated in fiber 150 may be extracted for use in an IFOG apparatus from end 151. The portion of fiber 150 indicated by arrow 171 acts as an absorber for superluminescent radiation and is utilized so that fiber 150 will remain a superluminescent light source and not break into laser oscillation. Under these conditions of operation, superluminescence radiation can be extracted only from end 151. However, superluminescent radiation generated in fiber 150 may also be extracted for use in an IFOG apparatus from end 152. In such an embodiment for extracting superluminescent light from end 152 of fiber 150, a dichroic reflector is typically disposed at end 151, i.e., a filter which is substantially transparent to pump radiation but which is reflective of the superluminescent radiation. However, in this embodiment, the entire length of the fiber is pumped, i.e., absorber section 171 is not present.

Figure 7:
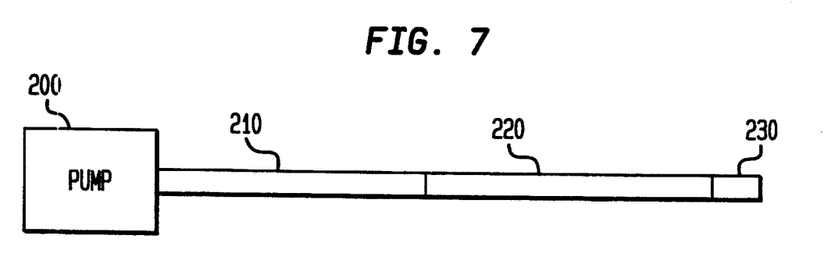
FIG. 7 shows, in pictorial form, a superluminescent all-fiber source wherein a pump is butt coupled to one end of an absorber fiber and the other end of the absorber fiber is spliced to one end of a Tm doped optical fiber.

As was discussed in the Background of the Invention, article 2 discloses a Nd doped optical fiber utilized in an all-fiber source for use in fabricating an IFOG apparatus. As disclosed in article 2, a samarium fiber was butt coupled to a diode pump array at one end and was spliced to the Nd doped optical fiber at the other end. As was further disclosed in article 2, the Sm doped fiber was substantially transparent at the pump wavelength and was heavily absorbing at the output of Nd, thereby providing isolation from the diode array facet. Unlike Nd, since Tm is a three level system, the use of an absorber like the Sm doped fiber described in article 2 is not necessary. However, if such absorption is required in certain configurations, one may utilize a terbium (Tb) or samarium (Sm) doped absorber fiber as shown in FIG. 7. FIG. 7 shows, in pictorial form, a superluminescent all-fiber source wherein diode pump 200 is butt coupled to one end of superluminescent radiation absorber fiber 210 and the other end of fiber 210 is spliced to one end of Tm doped optical fiber 220. Further, the other end of fiber 220 is coupled to an input fiber lead of 1.8 micron optical isolator 230. Optical isolator 230 may be, for example, a Faraday rotator and two polarizers which prevents light from the remainder of an IFOG from reentering active fiber 220.

Figure 8:
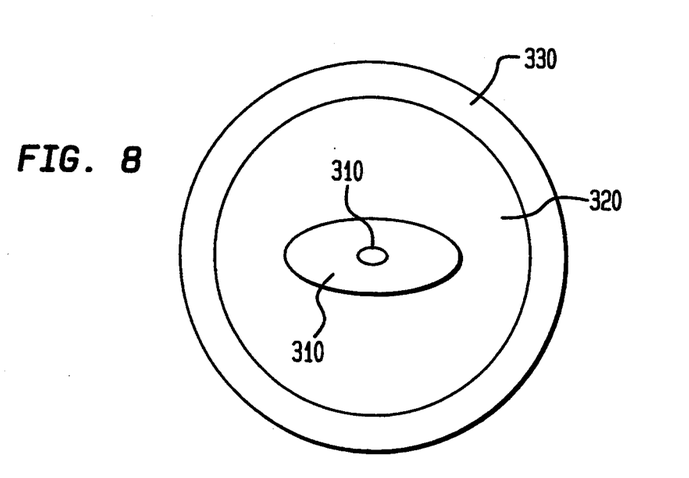
FIG. 8 shows, in pictorial form, a cross section of a double clad, $Tm^{+++}$ doped, optical fiber, superluminescent source.

Tm doped optical fibers are advantageous for a further reason. Tm optical fibers can be fabricated in the well known double cladding configuration to provide efficient pumping. FIG. 8 shows, in pictorial form, a cross section of a double clad, Tm+++ doped, optical fiber superluminescent source. As shown in FIG. 8, substantially single mode core 300 is fabricated for example, from Tm+++ doped SiO2; multimode core 310 is fabricated for example, from SiO2; low index cladding 320 is fabricated from for example, low index polymer or glass; and cladding 330 is fabricated for example, from hard polymer. The dimensions of substantially rectangular multimode core 310 may be fabricated so as to have dimensions which are determined in a manner well known to those of ordinary skill in the art as a matter of convenience for coupling radiation output by a pump thereinto. To absorb all the pump light, a dichroic reflector can be disposed at the exit end of the fiber. This reflector is transparent substantially at the superluminescent wavelength of 1.8 microns but is substantially reflective to the pump radiation. Alternatively, the fiber can be pumped from both ends by one source or by two sources. For example, pump radiation can be focused by lenses (not shown) from two pump sources (not shown), one pump source disposed at each end of the fiber.

For the fiber shown in FIG. 8, absorption in the single mode core is reduced per unit length by the ratio of the area of the core and the area of the first cladding, typically this ratio is of the order of 1/100. Notwithstanding this, the double clad configuration can be utilized for Tm doped optical fibers in practice because an optimum concentration of Tm+++ is relatively high. For example, one can expect to fabricate a double clad, Tm doped, optical fiber having lengths of about 10 to 20 m. However, by contrast, the double clad configuration cannot be utilized readily with Er doped optical fibers because efficient operation is accomplished only at low concentration. For example, one would expect to have to fabricate a double clad, Er doped, optical fiber having lengths on the order of 3 km, which length is not considered practical.

In accordance with the present invention, a Tm doped optical fiber is fabricated utilizing any of the well known methods of doping Tm in, for example, a fused silica fiber. In a preferred embodiment of the present invention, aluminum is utilized as a codopant of the Tm. The presence of aluminum has been found to increase the fluorescence efficiency as compared with the use of GeO2 as a codopant with SiO2 as the host. The better performance achieved by utilizing Al2O3 is believed to be due to the effect of the latter in helping to more uniformly disperse rare earth ions in the fused silica. Lastly, in fabricating an IFOG apparatus utilizing the inventive Tm doped optical fiber source, the Tm doped, optical fiber light source, the lithium niobate chip or other equivalent electro-optic element such as, for example, tantalum niobate, the single mode-single polarization fiber optic coil, and the InGaAs detector are assembled and operated in accordance with any of the standard methods which have been described for apparatus which utilize Er or Nd doped optical fiber light sources or superluminescent laser diode light sources in the art.

Lastly, the use of ZBLAN+ or chalcogenide glass as a host for the Tm to improve the quantum efficiency is not considered to be preferred at the present time due to difficulties one encounters in attempting to work with such glasses. However, preferred embodiments of the present invention are fabricated when utilizing germanate or tellurite glass as a host for the Tm+++ ions.

In fabricating Tm+++ doped optical fibers, the composition of Tm+++ ions in a host glass can range from 0.003 weight-percent to 0.3 weight-percent and beyond. Further, such compositions would be utilized in silicate glass as well as in germanate glass, tellurite glasses and so forth. In fact, at this point, there is no functional upper limitation which is expected which relates to an upper limit of Tm+++ composition. Because the superluminescent emission terminates in the ground 3H6 state, the threshold for significant superluminescent emission may be lowered by locating the Tm+++ ions only in the central portion (1/10-½) of the core, in which region the single mode field strength is the highest. Lastly, Tm+++ doped optical fibers may be fabricated in any number of ways which are well known to those of ordinary skill in the art. For example, one may fabricate silicate doped glass utilizing the well known MCVD process wherein rare earth ions are introduced into a fabrication system in the form of rare earth chelates.

It is to be appreciated and understood that the specific embodiments of the invention described hereinbefore are merely illustrative of the general principles of the invention. Various modifications may be made by those skilled in the art consistent with the principles set forth hereinbefore and without departing from their teachings.

What is claimed is:

1. A superluminescent source of radiation in a wavelength region substantially centered at about 1.8 microns which comprises:
    an optical fiber having a glass core which is doped with thulium ions; and
    means for generating pump radiation and for coupling the pump radiation into the doped core, the doping of the thulium ions being sufficient so that the pump radiation excites the thulium ions to a 3F4 state to produce an optical gain 3F4–3H6 transition; wherein the optical fiber is configured so that superluminescent radiation is output from the optical fiber, whereby superluminescent radiation is output from the optical fiber in the wavelength region substantially centered at about 1.8 microns.

2. The superluminescent source of claim 1 wherein the means for generating pump radiation comprises means for generating pump radiation substantially at 0.8 microns.

3. The superluminescent source of claim 1 wherein the means for generating pump radiation comprises means for generating pump radiation substantially at 1.2 microns.

4. The superluminescent source of claim 1 wherein the means for generating pump radiation comprises means for generating pump radiation substantially at 1.55 microns.

5. The superluminescent source of claim 1 wherein the glass core for the thulium ions is a silicate glass core.

6. The superluminescent source of claim 5 wherein the silicate glass core is codoped with aluminum.

7. The superluminescent source of claim 1 wherein the thulium ions are codoped with ions from a group consisting of erbium, ytterbium, or erbium and ytterbium.

8. The superluminescent source of claim 1 wherein the glass core for the thulium ions is a tellurite glass core.

9. The superluminescent source of claim 1 wherein the glass core for the thulium ions is a germanate glass core.

10. The superluminescent source of claim 1 wherein the glass core is a substantially single mode core and the optical fiber is further comprised of:
    a multimode core which surrounds the glass core; and
    one or more claddings which surround the multimode core.

11. The superluminescent source of claim 10 wherein the means for generating and coupling comprises means for coupling the pump radiation into a first and a second end of the optical fiber.

12. The superluminescent source of claim 10 wherein the means for generating and coupling comprises a first means for generating pump radiation and for coupling the pump radiation into a first end of the optical fiber and a second means for generating pump radiation and for coupling the pump radiation into a second end of the optical fiber.

13. The superluminescent source of claim 10 wherein the multimode core has a substantially rectangular cross-section.

14. The superluminescent source of claim 13 wherein the means for generating and coupling comprises means for coupling the pump radiation into one end of the optical fiber, and wherein the superluminescent source further comprises a dichroic reflector means disposed adjacent another end of the optical fiber, the dichroic reflector being substantially transparent to the superluminescent radiation and being substantially reflective to the pump radiation.

15. The superluminescent source of claim 13 wherein the glass core is highly doped with thulium, the thulium doping being about 5,000 parts per million by weight or greater.

16. The superluminescent source of claim 13 wherein the glass core is doped with at least as much as, or more than, about 0.003 weight-percent of thulium.

17. The superluminescent source of claim 1 wherein the length of the optical fiber is longer than a length required to absorb the pump radiation in the optical fiber.

18. The superluminescent source of claim 17 wherein the means for generating comprises a laser diode.

19. The superluminescent source of claim 1 wherein the glass core is comprised of a substantially single mode, glass core which is doped with thulium ions.

20. The superluminescent source of claim 19 wherein a cross section of the glass core has a core diameter and the thulium ions are substantially contained within a volume of the glass core having a cross section whose diameter is less than the core diameter.

21. The superluminescent source of claim 1 wherein the means for generating and coupling couples the pump radiation into one end of the optical fiber and wherein the superluminescent source further comprises:
    dichroic reflector means disposed adjacent the one end of the optical fiber, the dichroic reflector being substantially transparent to the pump radiation and being reflective to the superluminescent radiation.

22. The superluminescent source of claim 1 wherein the means for generating and coupling comprises:
    a source of pump radiation whose output is coupled to an optical fiber absorber, the optical fiber absorber being substantially transparent to the pump radiation and being substantially absorbing of the superluminescent radiation.

23. The superluminescent source of claim 22 wherein the optical fiber absorber is spliced to one end of the optical fiber.

24. The superluminescent source of claim 23 which further comprises:
    an isolator means for preventing radiation substantially at 1.8 microns from entering another end of the optical fiber.

25. The superluminescent source of claim 24 wherein the isolator means comprises:
a Faraday rotator; and
crossed polarizers.

26. The superluminescent source of claim 22 wherein the optical fiber absorber comprises a terbium doped, glass core, optical fiber.

27. The superluminescent source of claim 22 wherein the optical fiber absorber comprises a samarium doped, glass core, optical fiber.

28. The superluminescent source of claim 1 wherein the thulium ions are disposed within a central portion of the glass core, the central portion comprising from about one-tenth to one-half of the central portion of the glass core.

* * * * *